United States Patent [19]

Hugdahl

[11] Patent Number: 5,125,322

[45] Date of Patent: Jun. 30, 1992

[54] METHOD AND ARRANGEMENT FOR POSITIONING ACCURATELY THE PISTONS OF LOAD-CARRYING PRESSURE-FLUID CYLINDER DEVICES

[76] Inventor: Mats Hugdahl, Millingsnäs gård, S-640 51 Stjärnhov, Sweden

[21] Appl. No.: 487,146

[22] Filed: Mar. 2, 1990

[30] Foreign Application Priority Data

Mar. 9, 1989 [SE] Sweden ............... 8900833

[51] Int. Cl.⁵ ............................ F15B 13/16
[52] U.S. Cl. ........................... 91/390; 91/433
[58] Field of Search ............. 91/216 R, 217, 390, 91/433

[56] References Cited

U.S. PATENT DOCUMENTS

| | | | |
|---|---|---|---|
| 3,894,476 | 7/1975 | Cobb | 91/390 |
| 4,664,019 | 5/1987 | Lipinski et al. | 92/88 |
| 4,664,020 | 5/1987 | Kaiser | 92/88 |
| 4,754,692 | 7/1988 | Yoshida | 91/390 |
| 4,771,674 | 9/1988 | Hugdahl et al. | 91/217 |

Primary Examiner—Edward K. Look
Assistant Examiner—F. Daniel Lopez
Attorney, Agent, or Firm—Cushman, Darby & Cushman

[57] ABSTRACT

A method and an arrangement for positioning accurately the piston of a load-carrying pressure-fluid piston-cylinder device, in which the fluid is a compressible gas and the cylinder device is double-acting. A variable operating pressure (P1) acts on one side of the piston, and an applied pressure (P2) of constant value acts on the other side of the piston. The pressures (P1,P2) can be relieved alternately by evacuation, for movement of the piston in the cylinder device. A pressure regulator is provided which functions to detect the load acting on the cylinder device from an external load (F) and which includes a pressure chamber having a movable wall supporting the cylinder device, and in which the operating pressure (Pi) is applied via a valve, the opening and closing movements of which are determined by movements of the movable wall.

6 Claims, 3 Drawing Sheets

METHOD AND ARRANGEMENT FOR POSITIONING ACCURATELY THE PISTONS OF LOAD-CARRYING PRESSURE-FLUID CYLINDER DEVICES

BACKGROUND OF THE INVENTION

The present invention relates to a method and an arrangement for positioning the pistons of pressure-fluid cylinder devices.

Cylinder devices used for manouvering purposes and operated by fluid under pressure—e.g. compressed-air piston-cylinder devices, are often used to produce linear movements. The pistons of such devices are almost exclusively set to work between two fixed stop positions, normally the two end positions of piston travel. When the piston is intended to stop at a position intermediate of its two end positions, it is necessary to provide a brake arrangement or some other kind of mechanical stop. This is because the pressure fluid—the air—is compressible and cannot therefore hold the piston in an exact, fixed position when the piston is subjected to an external force or load which may vary intermittently or with time.

The presence of a brake arrangement or a mechanical stop, however, causes the piston to start and stop in pronounced jerks, due to the fact that the fluid pressure applied to the piston is sufficient to prevent the piston from "sinking back" at the start, and because the piston cannot be stopped in a correct position, simply by lowering the pressure.

The problem is well known and, consequently, when there is a desire or a need to position the piston of a piston-cylinder device in definite, selected positions, there is most often used a cylinder device which works with an incompressible fluid—hydraulic fluid. With such devices, the supply of pressure fluid—oil—is blocked with the aid of valves such as to lock the piston in the position desired. Hydraulic systems are encumbered with certain drawbacks, however, including high installation costs and high operating and maintenance costs. Furthermore, there is always a risk that the hydraulic oil will leak from the device and therewith create problems.

With the intention of eliminating the drawbacks associated with such piston-cylinder devices, Swedish Patent Application 8504344-6 (which corresponds to U.S. Pat. No. 4,771,674) proposes a method for positioning the piston of a piston-cylinder device with the aid of a pressure detector which detects the load acting on the piston and which is operative to send a control signal to a pressure regulator which, in turn, controls the pressure in the cylinder, so as to constantly to balance the force or forces acting on the piston. This enables the piston to be held in an exact, determined position, irrespective of whether the piston is subjected to load. Although this piston-positioning arrangement functions satisfactorily in practice, it is unnecessarily complicated and expensive. The arrangement is also prone to malfunction.

SUMMARY OF THE INVENTION

Accordingly the object of the present invention is to provide a method and an arrangement for exact positioning of the pistons of pressure-fluid operated cylinder devices including, compressed air-cylinder devices.

BRIEF DESCRIPTION OF THE DRAWINGS

The invention will now be described in more detail with reference to the accompanying drawings, in which.

DETAILED DESCRIPTION

Figure 1:
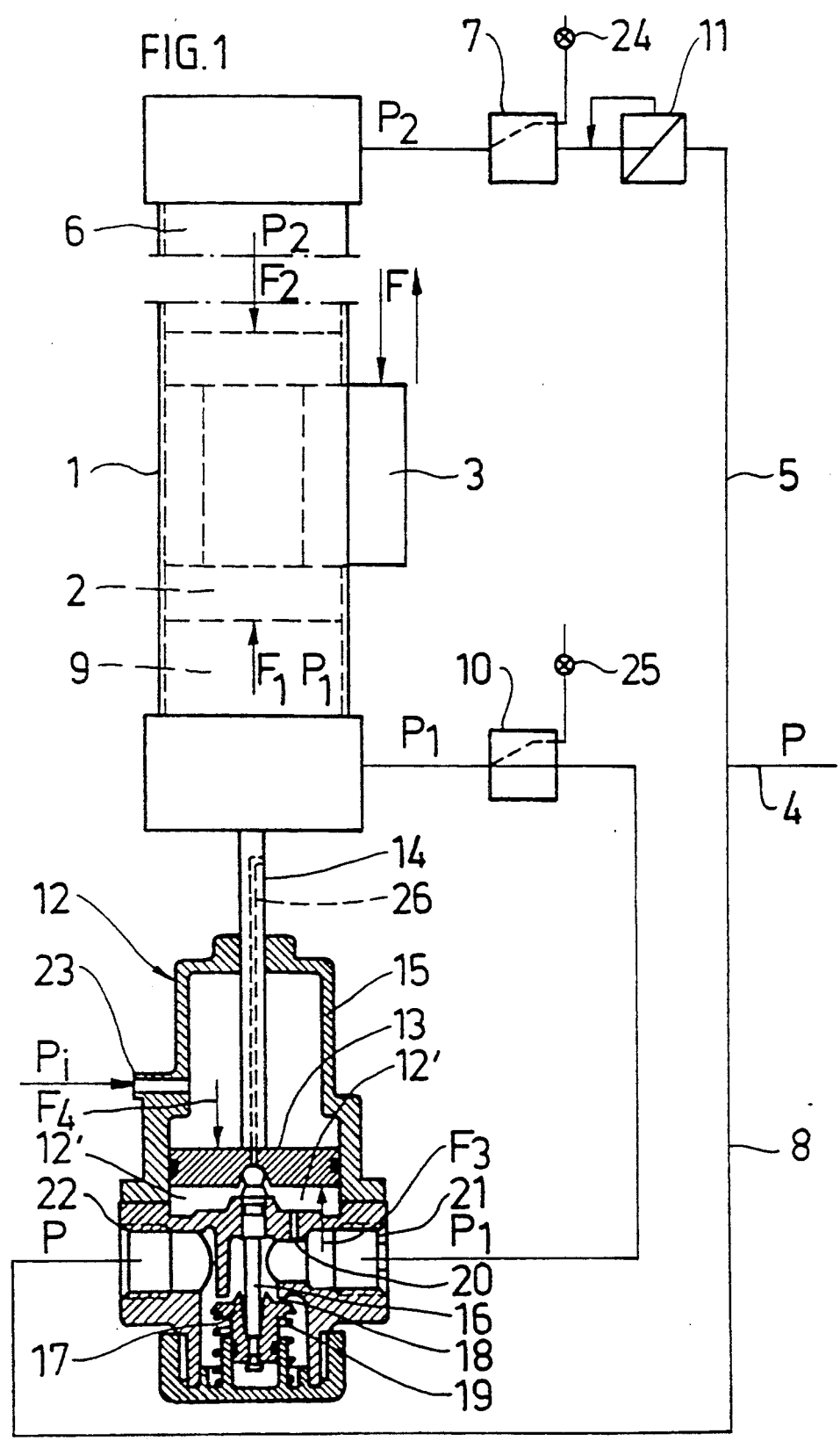
FIG. 1 is a diagrammatic illustration of the principles of the invention.

In FIG. 1 the reference numeral 1 identifies a pressure-fluid operated cylinder device, preferably a device operated with compressed-air. A piston 2 provided with a driving element 3 is mounted for movement axially in the cylinder 1. The illustrated cylinder 1 is of the kind which presents an elongated slot through which the driving element 3 extends, i.e. a piston cylinder device which lacks a piston rod. The driving element supports the load to be moved, and movement of said load is effected with the aid of piston movement. The force exerted by the load is referenced F (either an upwardly or downwardly directed load, as indicated in FIG. 1) and loads the piston 2 via the driving element 3. Also acting on the cylinder 1 is a further, external force $F_4$, which is intended to maintain an initial pressure in a pressure regulator 12, as described herebelow.

The pressure fluid—pressurized air—is delivered at pressure P through a pipe 4. The pipe 4 joins a line 5 which leads to the upper chamber 6 of the cylinder, via a multi-path valve 7, for instance a 3/2-valve, and also a line 8 which leads to the lower chamber 9 of said cylinder, via a further multi-path valve 10, for instance a 3/2-valve.

Air is delivered to the upper chamber 6 of the cylinder, said air being regulated to constant pressure $P_2$ by means of a pressure regulating unit 11. The air is delivered to the chamber through the multi-path valve 7, this valve also enabling the chamber 6 to be evacuated. The pressure forces exerted by the air on the upper surface of the piston 2 are referenced $F_2$ and derive from the pressure $P_2$.

The lower chamber 9 of the cylinder receives air via the multi-path valve 10, this valve also enabling the chamber 9 to be evacuated. In the FIG. 1 illustration, the air present in the chamber 9 exerts a pressure $P_1$. The force acting on the bottom surface of the piston 2 is referenced $F_1$ and is equal to the pressure $P_1$ multiplied by $A_1$, the area of the piston 2 being $A_1$.

In accordance with the invention, the pressure regulator 12 includes a pressure chamber 12' which is defined on one side thereof by a plunger 13 which is connected to the piston-cylinder device by means of a plunger rod 14 and which works in a cylinder 15. The plunger 13 cooperates with a valve pin 16 to move a valve body 17 away from and towards a valve opening 18, against the action of a coil spring 19. The underside of the plunger 13 communicates with an outlet port 21 of the regulator 12 via a passageway 20, and is therewith influenced by the pressure $P_1$. The inlet port 22 of the regulator 12 is connected to the line 8 and is therewith subjected to the pressure P. The upper surface of the plunger 13 is acted upon by a constant initial pressure $P_i$ or biassing pressure which is applied via a port 23 and which, together with the intrinsic weight of the cylinder device 1, produces the aforementioned force F4. Consequently, the force resultants F3 of F and F4 will act on the bottom surface of the piston 13.

The plunger rod 14 has a central passageway 26 which is intended for evacuating air so as to lower the pressure $P_1$ when the plunger 13 eases from the valve pin 16.

The preferred arrangement, as described with reference to FIG. 1, enables the piston 2 to be stopped in any desired, fixed position in the cylinder 1 without needing to provide external, mechanical locking devices. When the piston 2 is stationary, equilibrium prevails in the system, wherewith:

$F+F_4=F_3$ $F+F_2=F_1$ where $F_1=P_1 \cdot A_1$ and $F_3=P_1 \cdot A_3$

Consequently, $F+F_4=P_1 \cdot A_3$ $F+F_2=P_1 \cdot A_1$, i.e.

$$\frac{F+F_4}{F+F_2} = \text{constant}.$$

The equation is satisfied by $F_2=F_4$.
Consequently;
the constant = 1
and $A1=A3$.

When the piston 2 is stationary, the valve opening 18 is closed by the valve body 17. In order to move the piston 2 upwards, for instance, the setting of the valve 7 is adjusted so that the chamber 6 will be evacuated. The piston will then be moved upwards by the pressure prevailing in the chamber 9. This results in a decrease of the pressure P1, which also acts on the bottom surface of the plunger 13. The plunger 13 will then force the valve pin or spindle 16 together with the valve body 17 downwards, whereupon air will begin to flow past the valve body. When air is again introduced into the chamber 6 through the valve 7, the pressure P1 will rise and the plunger 13 will move upwards, causing the valve body to close the gap shown at 18. The system is now in equilibrium. If the pressure P1 is excessively high, the plunger 13 will ease from the valve pin 16, whereupon air is evacuated through the passageway 14.

Downward movement of the piston 2 is effected by adjusting the valve 10 to a setting in which the chamber 9 is evacuated. The speed at which the piston moves is regulated, suitably with the aid of throttle valves 24 and 25 arranged, for instance, in respective multi-path valves 7 and 10.

As soon as the driving-element 3 is loaded with an external, downwardly-acting force F, the valve body 17 will be moved away from the valve seating 18, via the plunger rod 14 and the valve pin 16, thereby causing the pressure P1 to rise. The plunger 13 will then be forced upwards and the valve body 17 will cut-off any further air supply, whereby a new state of equilibrium is reached. If the force F is directed upwards, or if the force F is reduced, the plunger 13 will ease away from the valve pin 16. As a result, the air enclosed in the chamber 9 will be evacuated through the passageways 20 and 26, until the plunger 13 has sunk to a level in which it blocks the passageway 26. The system is then again in equilibrium. The pressure P1 is adjusted with the aid of the valve 17,18 irrespective of the size of the load acting on the cylinder device, so that the pressure will constantly balance the load.

Figure 3:
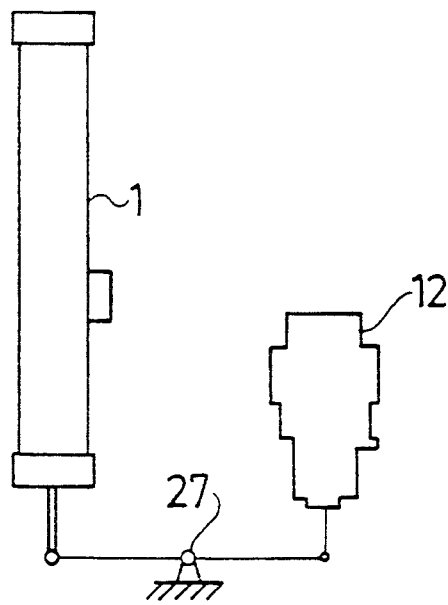
FIGS. 3, 4, 5 and 6 illustrate schematically modifications of the preferred embodiment of the apparatus of the invention.
Figure 4:
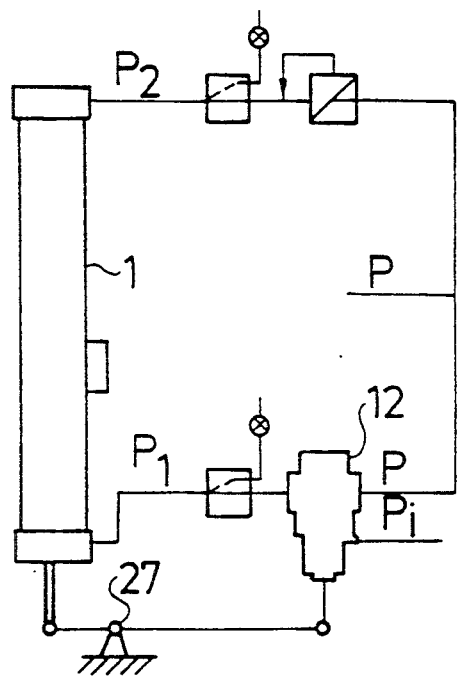

One prerequisite in this respect is that the area of the plunger 13 be equal to the area of the piston 2, as in the case of the embodiment illustrated in FIG. 1, wherein the cylinder 1 is supported directly by the pressure regulator 12. This will also apply when the cylinder 1 and the pressure regulator 12 with plunger rod 14 are mutually connected via a lever arm having a central fulcrum point 27, as illustrated in FIG. 3. When a lever transmission means is used, as in accordance with FIG. 4, where the fulcrum point 27 is located, for instance, at ¼ from the cylinder 1, the area of the plunger 13 can be made correspondingly smaller and in this case may be only ¼ of the area of the piston 2.

Figure 5:
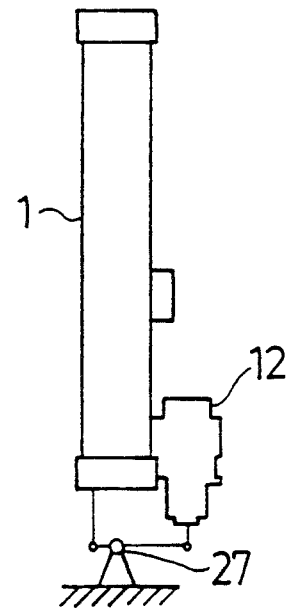

In the case of the exemplifying embodiments of the invention described with reference to FIGS. 1-4, the pressure regulator 12 is fixed in space, whereas FIG. 5 illustrates an arrangement in which the pressure regulator 12 is connected to the piston-cylinder device 1.

Figure 6:
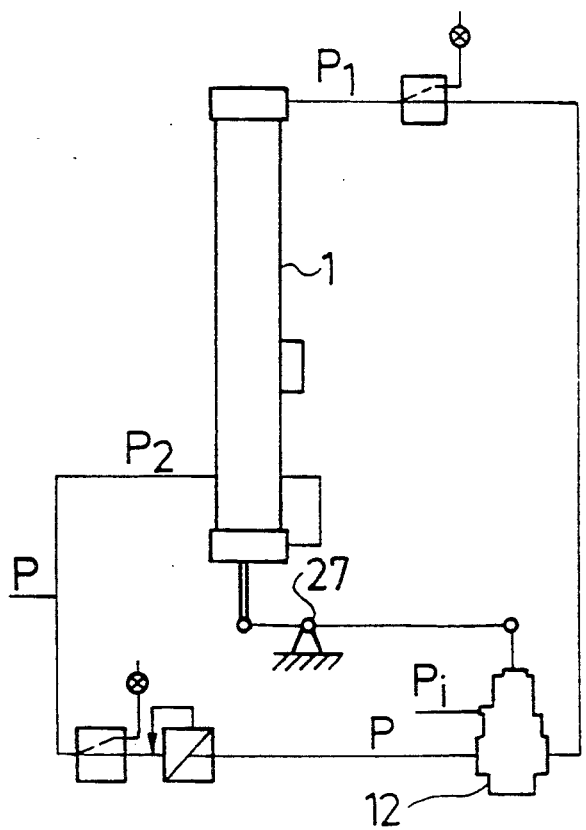

As beforementioned, the aforedescribed embodiment of the invention will operate according to the same principles, irrespective of the directional sense of the force F, i.e. the arrangement illustrated in FIGS. 1-5 can also be used upside down. In practice it may be more advantageous to place the regulator at the lower part of the cylinder. This configuration is illustrated in FIG. 6. For comparison reasons, FIG. 4 has been supplemented with the supply lines illustrated schematically in FIG. 1. Consequently, it is possible to balance the load F, irrespective of its directional sense and the positioning of the regulator.

Figure 2:
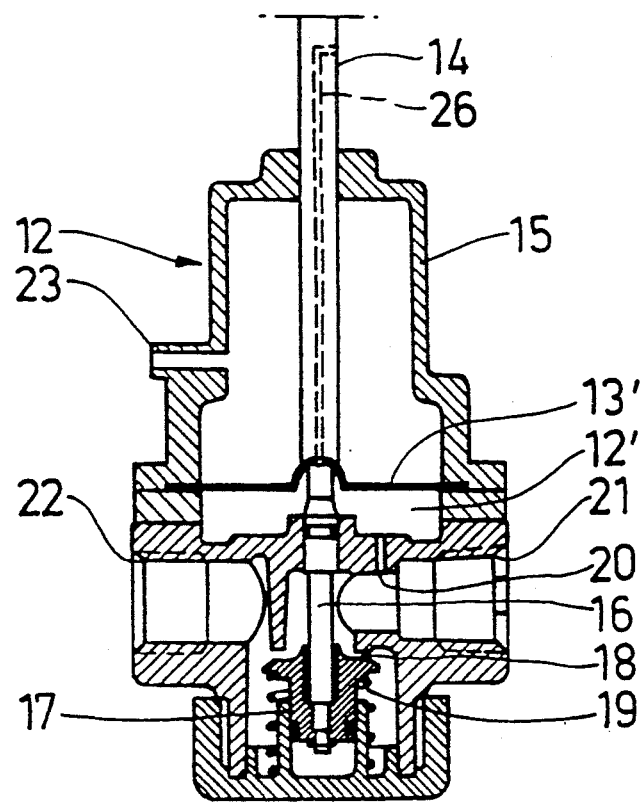
FIG. 2 illustrates an alternative embodiment of the pressure regulator.

It will be understood that the invention is not restricted to the illustrated and described exemplifying embodiments thereof and that modifications can be made within the scope of the following claims. For instance, it is conceivable that the plunger 13 can be replaced with a diaphragm operative to effect movement of the valve pin 16, as illustrated in FIG. 2.

I claim:

1. Apparatus for accurately positioning a piston of a load-carrying pressurized fluid-operated piston and cylinder device, which includes:
a piston slidably received in a cylinder having two ports respectively communicating with chambers within a cylinder on opposite ends of the piston, the piston having a driving element which is arranged to bear a downwardly acting load outside the cylinder and effectively connected to the piston through a wall of the cylinder for causing said load to bear downwardly on said piston; one of the ports being communicated effectively below the piston with a first valved supply circuit for a variable operating pressure, which, by opening and closing a first valve, can be selectively communicated to the respective chamber of said piston; the other of the ports being communicated effectively above the piston with a second valved supply circuit for an applied pressure of constant value, which, by closing and opening a second valve can be selectively communicated to the respective chamber of said piston; a pressure regulator interposed in one of said valved supply circuits and arranged to effectively thereby detect the load bearing down on the piston; said pressure regulator having a housing within which there is provided a chamber containing a vertically movable wall on which said cylinder is supported by a rod which penetrates through the housing of the regulator; means effectively communicating said variable operating pressure into said regulator in supporting relation to said movable wall for tending to vertically move said cylinder; said first valve being arranged by interaction with said regulator to open and close depending upon changes in vertical position of said movable wall;

means supplying a constant effectively downwardly applied biasing force on said movable wall for acting thereon in addition to downward force on said movable wall due to the weight of said piston and rod, and said downwardly acting load.

2. The apparatus of claim 1, wherein:

said regulator is interposed in said second valved supply circuit by having a through passageway having an inlet port and an outlet port;

an openable-closable valve interposed in said passageway between said inlet port and said outlet port;

said regulator housing including, in effectively underlying relation to said movable wall, a pressure chamber in communication with said through passageway downstream from said openable-closable valve; and means effectively connecting said movable wall with said openable-closable valve to provide means for opening and closing said openable-closable valve depending upon vertical disposition of said movable wall.

3. The apparatus of claim 2, further including:

spring means biasing said openable-closable valve towards a closed position.

4. The apparatus of claim 2, wherein:

said cylinder is supported on said movable wall of said regulator by means including a lever arm system having a horizontal axis pivot disposed in supporting relation to a lever are provided in said lever arm system between said cylinder and said movable wall, externally of said regulator.

5. The apparatus of claim 4, further including:

a fixed support on which said horizontal axis pivot is provided.

6. The apparatus of claim 5, wherein:

said housing of said regulator is fixed to said cylinder.

* * * * *